UNITED STATES PATENT OFFICE.

MAXIMILIAN ZINGLER, OF MIDDLESEX COUNTY, ENGLAND.

IMPROVEMENT IN THE MANUFACTURE OF VARNISHES.

Specification forming part of Letters Patent No. 173,200, dated February 8, 1876; application filed September 28, 1875.

*To all whom it may concern:*

Be it known that I, MAXIMILIAN ZINGLER, of 19 Buckland Crescent, Beloize Park, in the county of Middlesex, England, a subject of the Queen of Great Britain, have invented or discovered new and useful Improvements in Varnishes; and I, the said MAXIMILIAN ZINGLER, do hereby declare the nature of the said invention, and in what manner the same is to be performed, to be particularly described and ascertained in and by the following statement thereof—that is to say:

This invention has for its object improvements in varnishes.

In manufacturing varnishes I proceed as follows: I dissolve gum-copal or other hard gum heretofore used in varnish-making by means of a compound liquid. The compound liquid is composed of bisulphide of carbon one part, together with camphene or turpentine one part, benzole or rectified petroleum one part, and methylated spirit two parts, and to every one hundred pounds of gum, whether powdered or divided in small pieces, I add the same quantity (or more or less, according to the consistency of the required varnish) of the compound liquid, as described, and I put the mixture into a closed vessel in which a stirrer is provided, worked by some mechanical power, in order to work the gum with the said liquid.

The harder kinds of gum, such as Angola gum, animé, and Sierra Leone, I prefer to reduce to a fine powder before bringing them into contact with the compound liquid. In the case of the harder gums I prefer, also, to add a small quantity—say from ten to fifteen per cent—of tetrachloride of carbon before bringing them into contact with the solvent.

When the gum is thoroughly dissolved I place the solution in an open vessel, and let the liquid evaporate, either by air or slow heat, until I obtain a thick pasty-like gum, which resembles a thick elastic paste. This gum paste I put again into the vessel with the stirrer, into which I pour eupion; to every one hundred pounds of gum paste I add from one hundred to three hundred pounds of eupion, or more, according to the consistency of the varnish required.

Before using the ordinary commercial eupion I redistil the same, adding a small quantity of alkali—say, from three to five per cent. of either soda or potassa. I prefer to use bicarbonate of soda.

When the gum paste is entirely dissolved I pour it into another vessel or closed tank and let it stand for a few days until it becomes clear, the dirt having settled to the bottom.

The dissolved gum paste, after it has become clear, can at once be used as a varnish, or, if it is required to enhance its spreading qualities, I add to it a small quantity of oleaginous matter, such as linseed-oil or castor-oil.

The varnish prepared as above described is a good preservative of wood and metal. It will not be affected either by moisture, cold, or heat, for the following reasons: first, that the gums I employ are not deteriorated by heat, they not having been fused nor acted on by any acid; second I do not use any of the usual driers, which accelerate the oxidation of gums, and also attack metals; third, nor do I use any of the drying-oils, which likewise oxidize, and are affected by the atmosphere if too dry or too cold.

What I claim is—

1. The improved process of manufacturing varnish, hereinbefore described, which consists in dissolving gum-copal or other hard gum in a liquid composed of bisulphide of carbon, camphene, benzole, and methylated spirit, as specified, and afterward allowing the liquid to evaporate until a thick paste is obtained, and then dissolving the paste in eupion.

2. A varnish consisting of hard gum, bisulphide of carbon, camphene, benzole, methylated spirit, and eupion, in the proportions specified.

M. ZINGLER.

Witnesses:
G. F. WARREN,
JNO. DEAN,
No. 17 *Gracechurch Street, London.*